United States Patent [19]

Williamson

[11] 4,408,936
[45] Oct. 11, 1983

[54] TORQUE-LIMITED THREADED LOCKING FASTENER, AND METHOD FOR SETTING THE SAME

[75] Inventor: Herman L. Williamson, Seal Beach, Calif.

[73] Assignee: Hi-Shear Corporation, Torrance, Calif.

[21] Appl. No.: 225,356

[22] Filed: Jan. 15, 1981

[51] Int. Cl.³ .............................................. F16B 39/02
[52] U.S. Cl. ....................................... 411/3; 411/281; 411/5
[58] Field of Search ......................... 411/5, 3, 2, 1, 282, 411/281, 283, 284, 416; 29/517

[56] References Cited

U.S. PATENT DOCUMENTS 4,040,328  8/1977  Moenchinger ...................... 411/416
4,260,005  4/1981  Stencel ................................ 411/281

FOREIGN PATENT DOCUMENTS 844317  6/1970  Canada .................................... 411/3
1198913  6/1959  France ..................................... 411/3

Primary Examiner—Robert L. Wolfe
Attorney, Agent, or Firm—Donald D. Mon

[57] ABSTRACT

A torque limited threaded locking fastener and a method for setting it to form an assembly. The fastener comprises an externally threaded shank and an internally threaded collar. At least one convolution of the threads on the shank is non-circular. The collar has a nut section and a drive section. The drive section is shaped to be engaged by a driver. Between these sections there is formed a shear section having the least torque resistance of the sections. The shear section fractures when a predetermined torque is exerted between the two sections. The nut section has an internal thread engageable to the shank thread, and an external rib engageable by a swaging tool. The swaging tool radially inwardly deforms and displaces the rib so as to displace nut section material at the non-circular convolution whereby to lock the nut to the shank after, but only after, the drive section is torqued off. The rib is proportioned and arranged so that the swaging of the rib to a lesser radial dimension does not change the torque level which was applied when the drive section was torqued off.

11 Claims, 9 Drawing Figures

U.S. Patent   Oct. 11, 1983   4,408,936
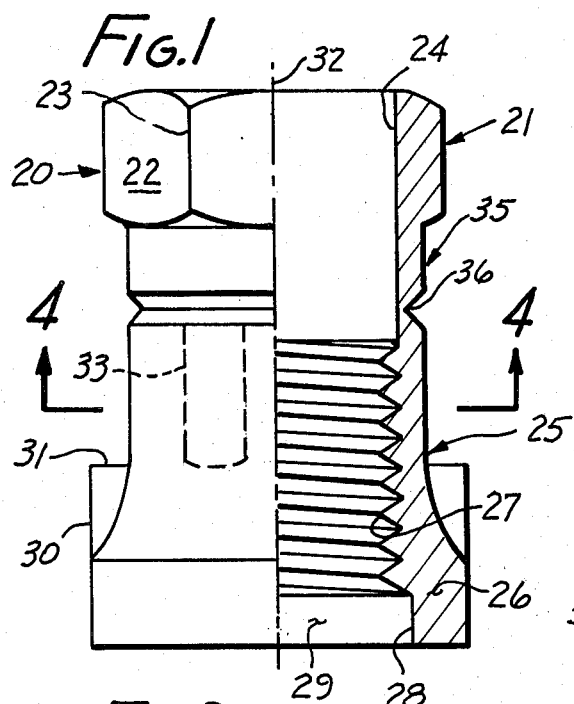
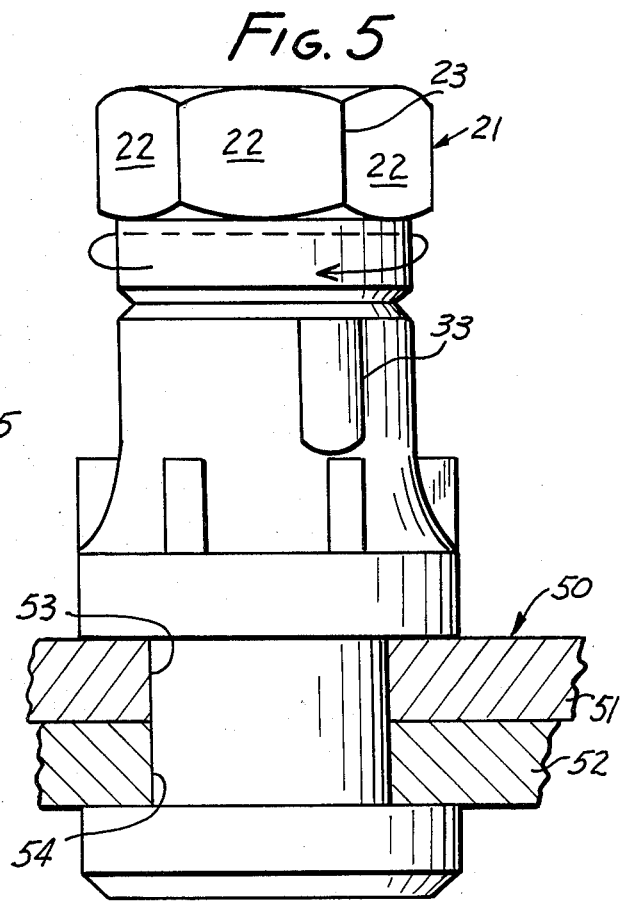
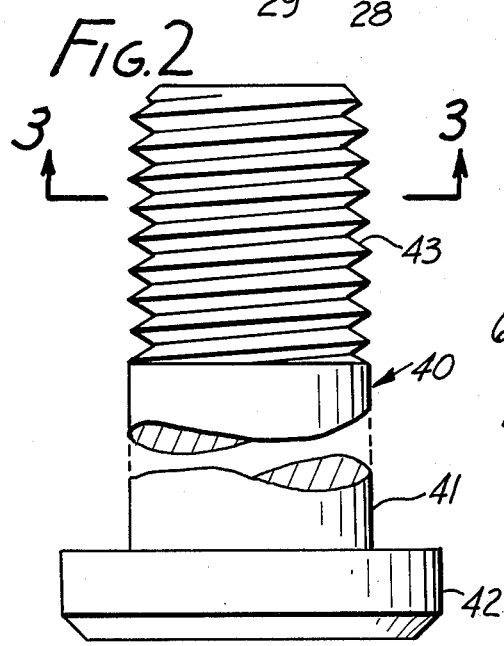
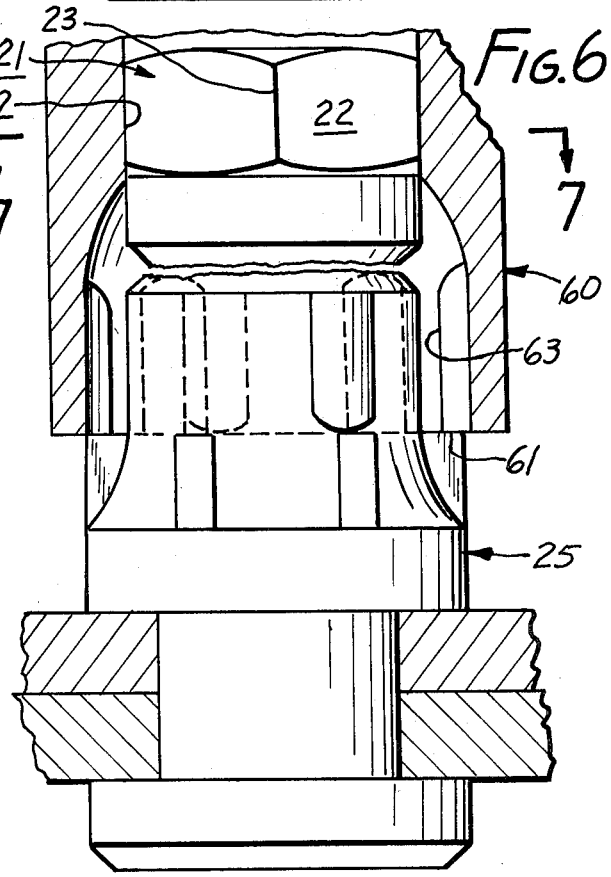
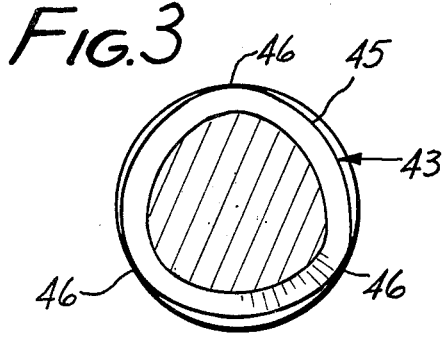

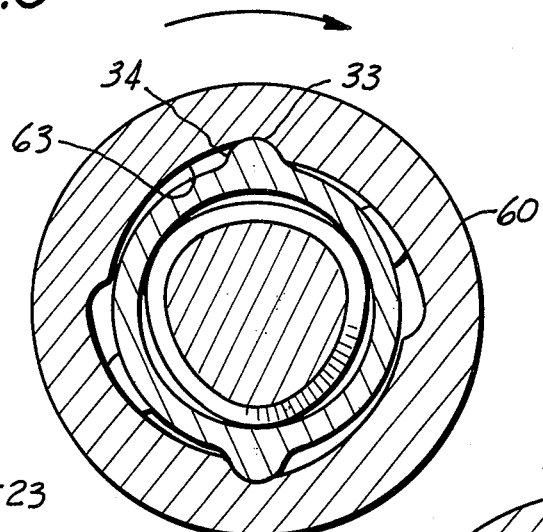
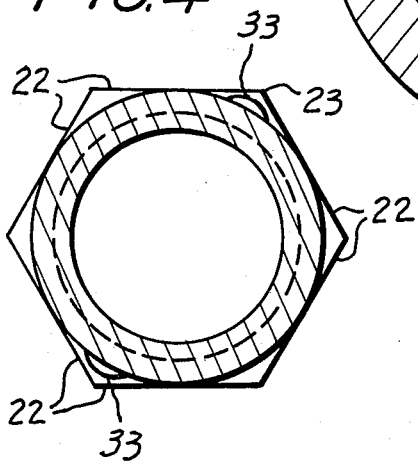
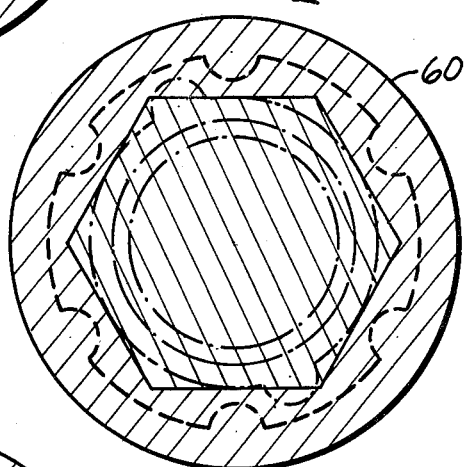
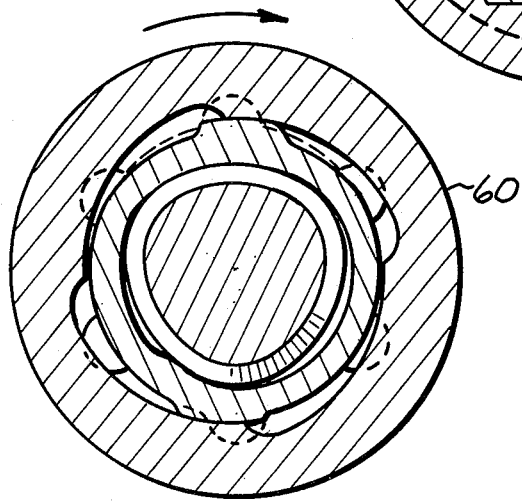

TORQUE-LIMITED THREADED LOCKING FASTENER, AND METHOD FOR SETTING THE SAME

FIELD OF THE INVENTION

This invention relates to torque-limited threaded locking fastener of the type which includes a threaded shank and a collar threaded onto the shank.

BACKGROUND OF THE INVENTION

A common objective of threaded fasteners is to be tightened to a sufficient but not excessive torque and then to be locked so as to retain that torque setting and the associated axial tensile preload on a shank member such as a bolt to which the threaded fastener is tightened. There are numerous examples in the art of such devices one of which is the well-known fastener shown in George S. Wing U.S. Pat. No. 2,940,495, issued June 14, 1960.

The fastener of the Wing patent utilizes a collar which includes a nut section that is internally threaded and is to be tightened onto a threaded shank. Integral with the nut section is a drive section with driver-engaging surfaces connected to the nut section by a shear section which has the least torque resistance of the three sections. When the predetermined torque is applied to the drive section the shear section fractures, and the drive section falls free, leaving the nut section correctly tightened onto the shank. In this classical fastener, a thread lock is exerted by a portion of the nut section having been initially pressed out of round and which is rounded out by engagement with the external thread so that the resulting springback exerts the desired locking action.

There has recently been developed a device known as "Eddie Bolt", in which a nut is formed with a set of external ribs that are engaged by a driver in such a way that the ribs are deflected radially inwardly and are plastically deformed as the consequence of application of a suitable torque on the ribs. The inward displacement of material of these ribs causes inward displacement of the nut material to engage the thread of a shank thereby to exert a locking force. The external rib is relied on both for torque definition and also for a locking action. This leads to an unfortunately critical relationship between the two functions.

It is an object of this invention to provide a fastener which can be locked to a thread having a non-circular convolution by inward displacement of rib and nut section material, but only after the nut has been set to a predetermined torque, and without thereafter affecting the torque setting.

BRIEF DESCRIPTION OF THE INVENTION

A torque-limited threaded locking fastener according to this invention includes an externally threaded shank and an internally threaded collar. At least one convolution of the thread on the shank is non-circular. The collar has a nut section and a drive section. A drive section is shaped to be engaged by a driver. Between these sections there is formed a shear section which has the least torque resistance of the three sections. The shear section fractures when the predetermined torque is exerted between the two sections. The nut section has an internal thread engagable to the shank thread, and an external rib engagable by a swaging tool. The swaging tool radially inwardly deforms and displaces the rib so as to displace nut section material at the non-circular convolution so as to lock the nut to the shank after, but only after, the drive section is torqued off. The rib is proportioned and arranged so that the swaging of the rib to a lesser radial dimension does not change the torque level that was applied when the drive section was torqued off.

According to a preferred but optional feature of the invention, there is a plurality of said ribs.

According to still another preferred but optional feature of the invention, the drive section is formed with driver engaging surfaces arranged in a polygonal pattern, and the rib is aligned with one of the corner intersections whereby a cam carried by a driver can pass the driver engaging section to permit driving surfaces to engage the drive section and to holds apart the cam and the rib until after the drive section has been torqued off of the nut section.

The above and other features will be fully understood from the following detailed description and the accompanying drawings, in which:

BRIEF DESCRIPTION OF THE DRAWINGS

FIG. 1 is a side view, partially in axial cutaway cross-section showing the collar portion of the presently preferred embodiment of the invention;

FIG. 2 is a side view of a shank member for use with the invention;

FIG. 3 is a cross-section taken at line 3—3 in FIG. 2;

FIG. 4 is a cross-section taken at line 4—4 in FIG. 1;

FIG. 5 is a side elevation showing the invention before full assembly;

FIG. 6 is a view similar to FIG. 5 but partly in axially cutaway cross section, after fracture has occurred;

FIG. 7 is a cross-section taken at line 7—7 of FIG. 6; and

FIGS. 8 and 9 are sequential views showing the thread locking action of the invention.

DETAILED DESCRIPTION OF THE INVENTION

FIG. 1 shows collar 20 according to the invention. The collar includes a drive section 21 which has a hexagonal, polygonal, array of driver-engaging surfaces 22 for engagement by drive surfaces of an appropriate torque-exerting tool. The driver-engaging surfaces meet at respective corner intersections 23. An unthreaded passage 24 is axially formed through the drive section to clear the external thread of a shank member yet to be described.

A nut section 25 includes a peripheral metal body 26 of material of suitable properties such as strength and ductility for the purposes intended. It has an internal thread 27 extending from a counterbore 28 at one end of a passage 29 and extending toward passage 24 in the drive section. On its external surface it has a plurality of stop members 30 with stop surfaces 31 intended to limit the axial progress of a driver along central axis 32 of the collar. On its outer periphery it has at least one, and preferably a plurality of ribs 33 which are adapted to be cammed in order to lock the nut section as will later be described. Each rib has a cam surface 34 facing in its counterclockwise direction for engagement by a cam on a tool that is yet to be described.

A shear section 35 joins the drive section to the nut section. It includes a peripheral groove 36 which reduces the wall thickness of the collar to such an extent that it forms a peripheral region of least resistance to torque of the three sections i.e. of sections, 21, 25 and 35. Thus in accordance with the principals described in the said Wing U.S. Pat. No. 2,940,495 the exertion of a predetermind torque which is determined by the properties and material and the dimensions of the body at groove 36, the drive section will torque off and leave the nut section set at a torque which is determined by that which is required to shear off the drive section at groove 36. The said Wing patent is incorporated herein by reference for its showing of design criteria and dimensions for the torque-off feature.

The object of all this is to apply the nut section at a predetermined torque to a shank member 40. Member 40 may be a bolt, for example, having a shank 41, a head 42 at one end of the shank, and an external thread 43 at its other end. At least one convolution (shown as convolution 45 in FIG. 3) is non-circular. In fact it is an advantage of this invention that this thread may include at least one non-circular lobe 46 and preferably will be made trilobular as shown in FIG. 3, including three lobes 46. This is a form of thread which is well understood and illustrated in many prior art patents for example in U.S. Pat. No. 2,940,495. It is readily adapted to receiving a circular threaded nut. Instead of a trilobular construction which can be formed by grinding operations a conventional thread may be ground off to such a shape, or flats may be ground on a conventional thread, or a conventional thread may be notched. While one non-circular convolution will be adequate to provide at least some resistance to torque, usually at least two or three such non-circular convolutions will be formed, and often all of them will be. At least one will be aligned with the rib so material will be forced against it. Materials to be locked in to the thread will of course be displaced into a non-circular convolution.

As best shown in FIG. 5, a joint 50 is formed of a pair of work pieces 51, 52 with aligned apertures 53, 54 through which the shank of the member is passed with the head abutting one side and the collar member tightened down against the other side.

As best shown in FIG. 6, a tool 60 is applied to set the joint. It includes a bell-mouthed opening 61 at one end, with a hexagonal array of driver surfaces 62 therein. These are proportioned so as to engage drive section 21. Closer to the mouth end of the opening there is provided a group of cams 63, which cams are aligned with the center portions of the driver engaging surfaces, and are proportioned so as to pass over the central portion of the driver engaging surfaces on the drive section so that the tool can be brought into full engagement with the drive section. The alignment of the ribs with the intersections of the driver engaging surfaces 22 on the drive section enable this relationship to exist.

As best shown in FIG. 6, the tool's axial progress will be stopped by the stop surfaces 31. Now it will be seen that torque can be exerted on the collar member, while restraining the shank against rotation by any desired means such as by engaging it or by engaging the head, and the relationship between the elements will be as shown in FIG. 7. When the pre-determined torque is exerted, the shear section will fracture as shown in FIG. 6 and then, but not until then, relative rotational movement between the nut section and the tool becomes possible. This brings cam surfaces 64 of the tool into abutting engagement with the ribs and will begin the process of swaging the ribs and the nut material radially inwardly to engage the non-circular convolution. It will also "smear" the rib material circumferentially somewhat as best shown in FIG. 9. Finally the swaging is complete and the tool begins to spin, while bearing against stops 31, and the setting is complete.

The ribs are so proportioned that the thread locking action exerts a torque on the nut section which is less than that at which the nut section was set when the shear section fractured. Therefore the torque level which was established by fracture of the shear section is not disturbed by the locking action. They are completely independent of one another and can occur ony sequentially.

This invention thereby provides a torque-limited threaded locking fastener which enables it in a single procedure to be set to a predetermined torque and sequentially locked, with the locking and the torque setting features independent of one another.

This invention is not to be limited by the embodiment shown in the drawings and described in the description which is given by way of example and not of limitation but only in accordance with the scope of the appended claims.

I claim:

1. A torque-limited threaded locking fastener comprising:

a shank member having an axis, a head adjacent to one end, and an external thread adjacent to the other end thereof, said thread having a plurality of convolutions, at least one of said convolutions when viewed axially being non-circular;

a collar member comprising a nut section having an axially extending internal thread and at least one integral external rib projecting beyond the outer wall of said nut section and so disposed and arranged as to be axially aligned with the non-circular thread when said nut is fully engaged to said shank member, a drive section having an internal passage aligned with and larger than said internal thread, and a non-circular driver-engaging surface to receive a driver for applying torque to said drive section, and a shear section joining said nut section and drive section, said shear section having the least resistance to torque of said sections whereby to fracture when a predetermined torque is applied to said drive section;

said rib being so proportioned and arranged that when a swaging tool is applied to displace the rib material radially inward thereby to displace material of which the nut section is made into said non-circular thread to lock said nut section to said thread after it does so, but only after, the drive section has torqued off, and without increasing the torque which existed when said shear section fractured;

the material of said rib and of said nut section being sufficiently ductile to enable said rib to be swaged inwardly.

2. A fastener according to claim 1 in which said non-circular thread convolution includes at least one non-circular lobe.

3. A fastener according to claim 2 in which said non-circular thread convolution is tri-lobular.

4. A fastener according to claim 1 in which said shear section comprises a groove forming a circular cross-section so dimensioned as to fracture at said predetermined torque.

5. A fastener according to claim 1 in which there is a plurality of said ribs, each of said ribs having a cam-like edge to facilitate the progressive engagement of a rotary swaging tool when said tool is rotated against said ribs to displace said rib material radially inwardly and circumferentially.

6. A fastener according to claim 1 in which there is provided a stop integral with said nut section and projecting beyond its outer wall to stop the swaging tool at a predetermined axial location.

7. A fastener according to claim 1 in which there are at least three of said driver-engaging surfaces arranged as a regular polygon, said rib being aligned with one of their intersections, whereby a tool having a cam which is adapted to engage and swage said rib can be advanced along said collar so said cam passes a said driver engaging surface at an angular spacing from said intersection, whereby when a geometrically-similar set of driver surfaces engages said driver engaging surfaces in torque-applying relationship, said cam is axially aligned with said rib but prevented from relative swaging movement until after said shear section has fractured.

8. A fastener according to claim 7 in which there are two of said ribs, located 180° apart, and in which said non-circularity includes eccentricities other than 180° apart.

9. A fastener according to claim 8 in which said non-circular convolution is tri-lobular.

10. In combination with a fastener according to claim 1, a swaging tool for setting said fastener, said tool comprising a rotatable body having a central axis and an open end, a first internal wall adjacent to said first end which includes an axially-extending cam adapted to engage said rib, a second internal wall coaxial with and axially spaced apart from said first internal wall having a regular polygonal array of driver surfaces adapted to engage said driver engaging surfaces, said cam being circumferentially aligned with the central portion of one of said driver surfaces.

11. A method for applying an internally threaded fastener to the external thread of a shank member, which external thread includes a non-circular convolution, and locking a section of said fastener to said convolution with a predetermined torque exerted thereon, said method comprising:

to a collar having an internal passage with an internal thread adapted to engage said external thread, a nut section containing said internal thread, a drive section with a passage proportioned to clear said thread, and a shear section joining said nut section to said drive section, said shear section having the least resistance to torque of said sections, tightening said collar onto said shank thread until said collar fractures at said shear section; and swaging a portion of said nut section into rotation-resisting relationship with said non-circular convolution, exerting a torque less than that which caused said fracture while so doing.

* * * * *